(12) United States Patent
Turner

(10) Patent No.: US 7,085,836 B1
(45) Date of Patent: Aug. 1, 2006

(54) SYSTEM AND METHOD FOR AUTOMATIC PRIVATE IP ADDRESS SELECTION

(75) Inventor: James Randall Turner, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 799 days.

(21) Appl. No.: 09/934,305

(22) Filed: Aug. 20, 2001

Related U.S. Application Data

(60) Provisional application No. 60/226,226, filed on Aug. 18, 2000.

(51) Int. Cl.
*G06F 15/13* (2006.01)

(52) U.S. Cl. .................. 709/226; 709/203; 709/227

(58) Field of Classification Search ................ 709/203, 709/226, 227
See application file for complete search history.

(56) References Cited

U.S. PATENT DOCUMENTS 6,826,611 B1 * 11/2004 Arndt ......................... 709/226
2001/0017857 A1 * 8/2001 Matuskawa
2001/0056499 A1 * 12/2001 Shirai et al.
2002/0066029 A1 * 5/2002 Yi
2004/0136337 A1 * 7/2004 Warrier et al.

* cited by examiner

*Primary Examiner*—John Follansbee
*Assistant Examiner*—Jinsong Hu
(74) *Attorney, Agent, or Firm*—Blakely, Sokoloff, Taylor & Zafman LLP

(57) ABSTRACT

A system and method for automatically selecting and assigning private IP addresses to locally networked devices are provided whereby a mechanism exists to prevent an overlap in private IP addresses assigned to a gateway device and to the various locally networked devices. An IP module of the gateway device determines if a default private IP address space allotted to the networked devices overlaps with the private IP address assigned to the gateway device by an ISP. Should an overlap occur, the IP module iterates through available private IP address spaces and selects a largest non-overlapping block from which private IP addresses may be parceled out to the networked devices.

21 Claims, 3 Drawing Sheets

SYSTEM AND METHOD FOR AUTOMATIC PRIVATE IP ADDRESS SELECTION

CROSS-REFERENCE TO RELATED APPLICATION

This application claims the benefit of U.S. Provisional Patent Application Ser. No. 60/226,226, filed on Aug. 18, 2000, entitled "System and Method for Automatic Private IP Address Selection," which is incorporated herein by reference.

BACKGROUND OF THE INVENTION

1. Field of the Invention

The present system and method relates generally to communications systems, and more particularly to automatic private Internet Protocol (IP) address selection and assignment in a network.

2. Description of Related Art

Presently, the Internet is a network of virtually connected network-enabled devices using Transmission Control Protocol (TCP) and Internet Protocol (IP). TCP/IP is a combination of these two means to deliver data from a host to a client that involves converting large data blocks into a plurality of small data packets for transmission across transmission devices. These data packets typically travel through an Internet Service Provider (ISP) before being forwarded to an end user.

An address of a computer or similar networking device attached to a TCP/IP network is called an Internet Protocol address ("IP address"). The IP address is made up of a network address and a host address (i.e., netid and hostid) contained in 32 bits for each TCP/IP packet. Every device communicating over the TCP/IP network has a unique IP address, which may be either a permanent address or one that is dynamically assigned during each network session.

Due to an increase in the number of node in the Internet, there is a potential shortage of public IP address space. In order to preserve a finite amount of public IP address space, ISPs may dynamically assign private IP addresses to the end user instead of public IP addresses. More particular to Digital Subscriber Line (DSL) ISPs, a private IP address may be assigned to the end user's gateway device. In turn, each gateway device assigns private IP addresses to various personal computers and other electronic devices connected to the gateway device, for example, devices in a home network. However, if the private IP address space assigned by the gateway device to various network devices in the home network overlaps with the private IP address space assigned by the ISP to the gateway device, then data packets could potentially get lost or sent to a wrong address.

Therefore, there is a need for a system and method to prevent overlap of private IP address space. More particularly, there is a need for a system and method to automatically select and assign non-overlapping private IP address space.

SUMMARY OF THE INVENTION

The present system and method overcome or substantially alleviate prior problems associates with the assignment of private IP address space. In general, the present system and method provide automatic private IP address selection and assignment to various network devices within a local network. In an exemplary embodiment, a gateway device within the local network automatically selects and assigns private IP addresses to various co-networked devices.

Because an ISP may assign a private IP address to the gateway device, the present system includes a mechanism to prevent an overlap in the private IP addresses assigned to the gateway device and to the various networked devices. In one embodiment, an IP module in a gateway device determines if a default private IP address space allotted to the networked devices overlaps with the private IP address assigned to the gateway device by the ISP. Should an overlap occur, the IP module iterates through available private IP address spaces and selects a largest non-overlapping block from which private IP addresses may be parceled out to the networked devices.

Accordingly, the present system and method automatically select and assign private IP addresses to locally networked devices. The entire process is transparent to the end user and is performed efficiently and rapidly. Other advantages, features and embodiments of the present system and method will be apparent from the drawings and detailed description as set forth below.

DESCRIPTION OF THE PREFERRED EMBODIMENT

Figure 1:
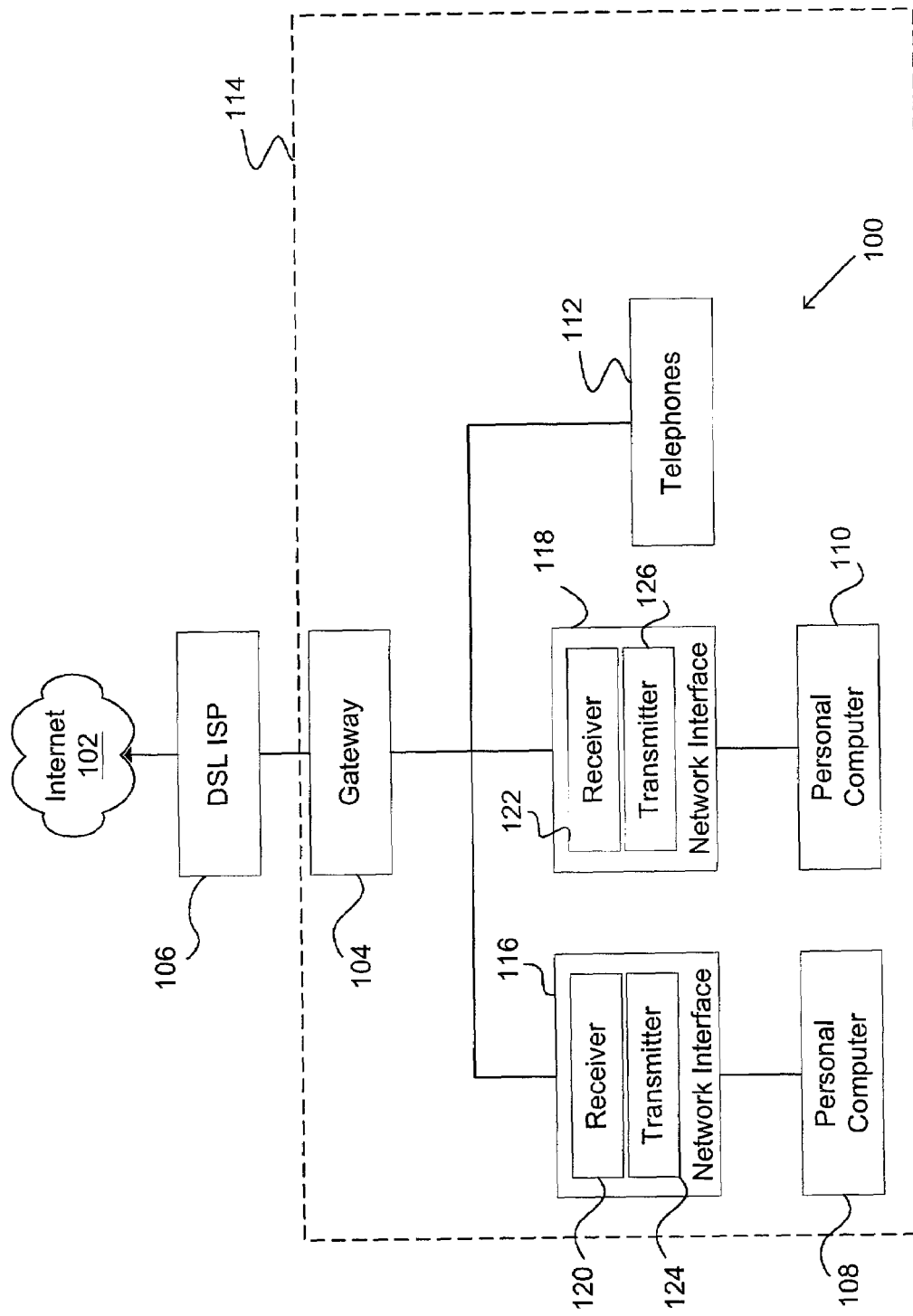
FIG. 1 is a block diagram illustrating an exemplary local network connected to the Internet.

FIG. 1 is a block diagram of an exemplary local network 100, such as a telephone wiring network, an Ethernet network, a wireless network or the like, connected to Internet 102 via a gateway device 104 and a DSL ISP 106. According to one embodiment, the network 100 includes the gateway device 104, personal computers 108 and 110, and telephones 112. Other network devices such as Internet radios or additional personal computers may be included in the network 100. The components of the network 100 are illustrated as being disposed in a central location 114 (e.g., a home or business).

The various network devices (e.g., personal computers 108 and 110) communicate with the gateway device 104 through network interfaces 116 and 118 which may be an Ethernet, Home Phoneline Network Alliance (HPNA), wireless, or any other type of network interface. Each network interface 116 and 118 further includes a receiver 120 and 122 and transmitter 124 and 126 for receiving and transmitting data packet signals via the gateway device 104.

DSL ISP 106 assigns the gateway device 104 a private IP address from either Class A which has 16 million available nodes, Class B which has 65,000 available nodes, or Class C which has 256 available nodes of private IP address space as defined in the Internet Engineering Task Force ("IETF") RFC 1918 document. The DSL ISP 106 is also coupled to numerous other gateway devices (not shown). Although the exemplary embodiment discloses a DSL ISP, other types of ISPs may be utilized. Furthermore, the gateway device 104 may be a residential gateway device.

Figure 2:
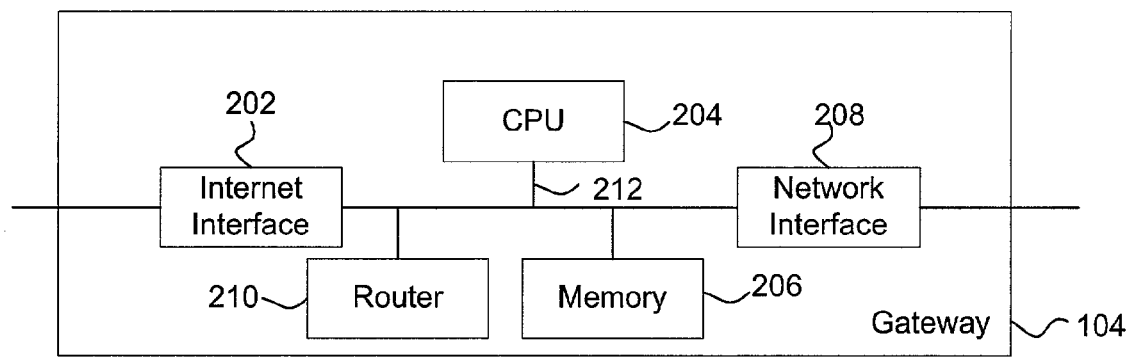
FIG. 2 is a block diagram of an exemplary gateway device of FIG. 1.

FIG. 2 illustrates one embodiment of the gateway device 104 of FIG. 1. The gateway device 104 is responsible for assigning non-overlapping private IP addresses to the various network devices in network 100, such as the personal computers 108 and 110. As shown, the gateway device 104 includes an Internet interface 202, a CPU 204, a memory 206, a local network interface 208 and a router 210 all coupled together via system bus 212. The Internet interface 202, which may comprise an ADSL modem or similar device, sends and receives data to and from the Internet 102 via DSL ISP 106 (FIG. 1), while the local network interface 208 sends and receives data to and from the network devices of the local network 100 (FIG. 1).

The gateway device 104 acts as a network address translator by presenting itself as one IP address for communication with the Internet 102, while keeping individual private IP addresses hidden from the outside world. Essentially, the gateway device 104 (or the router device 210 of the gateway device 104) isolates public and private networks and translates private IP addresses to public IP addresses and vice-versa. Thus, the gateway device 104 insures that a private IP address in not valid on the public Internet 102. Additionally, the gateway device 104 may perform other functions such as supporting IP routing, providing a security firewall, and bridging.

The memory 206 may comprise any, or a combination of, a variety of types of conventional memory devices, including a hard drive, RAM, ROM, or flash memory. In the present embodiment, the memory 206 is RAM and ROM. Program instructions, as will be discussed below in connection with FIG. 3, are stored in ROM and loaded into RAM when CPU 204 performs the method of FIG. 4.

Figure 3:
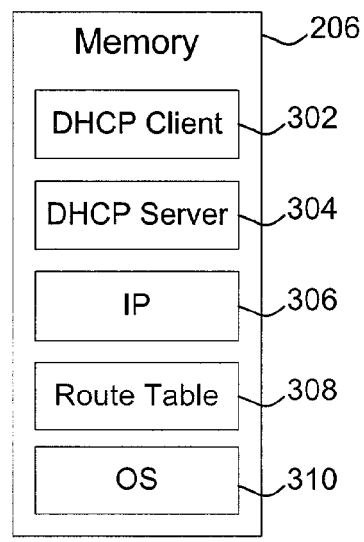
FIG. 3 is a block diagram of a memory of FIG. 2.

FIG. 3 is a detailed illustration of one embodiment of the memory 206. Memory 206 includes a Dynamic Host Configuration Protocol ("DHCP") client 302, a DHCP server 304, an IP module 306, a route table 308 and an operating system ("OS") 310. OS 310 can be any operating system capable of executing program instructions stored in the memory 206.

DHCP software automatically assigns IP addresses to clients logged onto a TCP/IP network thereby eliminating manual assignment of permanent IP addresses. Initially, DHCP client 302 determines the private IP address that DSL ISP 106 (FIG. 1) assigns to the gateway device 104 (FIG. 1). Alternatively, a Point-to-Point Protocol ("PPP") client may be utilized in place of the DHCP client 302. Subsequently, the DHCP server 304 automatically selects and dynamically assigns different private IP addresses to the various network devices in the local network 100, including the personal computers 108 and 110. Each time the personal computers 108 and 110 or other network device connects to the Internet 102 (FIG. 1) via the gateway device 104, the DHCP server 304 assigns a new private IP address to each network device.

The IP module 306 specifies the network layer format of the data packets sent between the personal computers 108 and 110, other network devices, and servers (not shown) coupled to the Internet 102. Additionally, the IP module 306 performs addressing operations on the data packets. A more detailed discussion of the IP module 306 will be presented in connection with FIG. 4.

The route table 308 is a table of IP destinations and the interfaces required for sending packets to their respective destinations. Upon receiving a packet, the IP module 306 identifies the destination IP address of the packet. Subsequently, the IP module 306 references the route table 308 for determining to which interface (e.g., network interfaces 116 and 118) the packet should be forwarded. Furthermore, a maximum transmission unit ("MTU") value associated with the destination interface may be examined in order to determine the largest packet size that can be transmitted. Thus, messages longer then the MTU must be divided into smaller packets before transmission.

Figure 4:
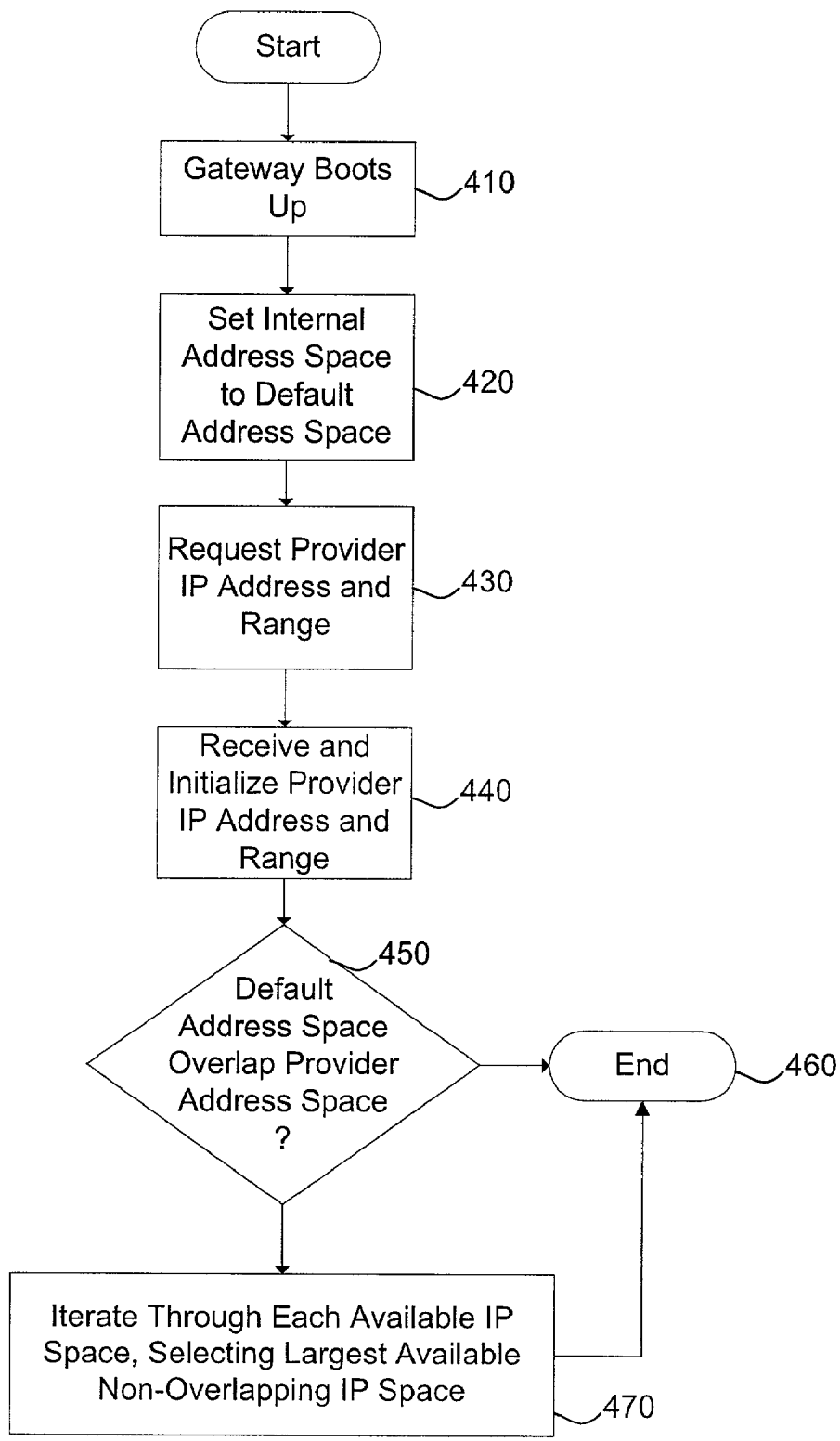
FIG. 4 is a flowchart illustrating one embodiment of a method for automatically selecting and assigning non-overlapping private IP addresses.

FIG. 4 is a flowchart 400 illustrating a preferred method for automatically selecting and assigning non-overlapping private IP addresses. In block 410, the router device 210 (FIG. 2) in the gateway device 104 (FIG. 1) boots up. Next in block 420, the IP module 306 (FIG. 3) sets internal address space to a default address space. In other words, IP module 306 allots the default address space for use by the personal computers 108 and 110 or other network devices coupled to the gateway device 104.

Subsequently in block 430, the DHCP client 302 (FIG. 3) requests a private IP address and range (IP address space) assigned to the gateway device 104 by the DSL ISP 106 (FIG. 1). For example, the DSL ISP 106 may have assigned a subnet (multiple private IP addresses) to the gateway device 104 starting with private IP address 10.0.0.0 with a range of 5 (i.e., to 10.0.0.4). It should be noted that if the memory 206 (FIG. 2) stores a PPP client instead of the DHCP client 302, the PPP client can request the private IP address and range assigned to the gateway device 104.

Next, the IP module 306 receives and initializes the private IP address and range provided by the DSL ISP 106 in block 440. If the range of the provided private IP address space is one, then the IP module 306 assigns the gateway device 104 the single private IP address. Alternatively, if the range is more than one, the IP module 306 assigns the gateway device 104 one of the private IP addresses, and the remaining private IP addresses are assigned to other networked devices on the local network 100 (FIG. 1).

In block 450, the IP module 306 determines if the default IP address space overlaps the private IP address space assigned by the DSL ISP 106. If there is no overlap, then the process ends. However, if there is an overlap, the IP module 306 iterates through available private IP address spaces, as specified by RFC 1918, and selects a largest non-overlapping block. Once a non-overlapping private IP address space is selected, the DHCP server 304 can parcel out private IP addresses to the personal computers 108 and 110 and other network devices which will not conflict with the private IP address selected by the DSL ISP 106. Accordingly, the present invention provides a system and method to prevent overlap of private IP address space by automatically selecting and assigning non-overlapping private IP addresses.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present system and method.

What is claimed is:

1. A method for automatically selecting and assigning non-overlapping private IP addresses comprising:
   setting an internal address space to a default private IP address space, wherein IP addresses from a private address space are not directly accessible from the public internet;
   receiving a provider private IP address and range;
   determining if the default private IP address space overlaps with the provider private IP address and range; and
   selecting a largest available non-overlapping private IP address space if the default private IP address space overlaps with the provider private IP address and range.

2. The method of claim 1 further comprising:
   requesting the provider private IP address and range.

3. The method of claim 1 wherein the selecting further comprises iterating through each available private IP address space to find the largest available non-overlapping private IP address space.

4. The method of claim 1 further comprising:
selecting from the default IP address space a private IP address and assigning the selected private IP address to a network device if the default private IP address space does not overlap with the provider private IP address and range.

5. The method of claim 1 further comprising:
selecting a private IP address from the largest available non-overlapping private IP address space and assigning the selected private IP address to a network device if the default private IP address space overlaps with the provider private IP address and range.

6. A system for automatically selecting and assigning non-overlapping private IP addresses comprising:
means for setting an internal address space to a default private IP address space, wherein IP addresses from a private address space are not directly accessible from the public internet;
means for receiving a provider private IP address space;
means for determining if the default private IP address space overlaps with the provider private IP address space; and
means for selecting a largest available non-overlapping private IP address space if the default private IP address space overlaps with the provider private IP address space.

7. The system of claim 6 further comprising means for iterating through available private IP address space to find the largest available non-overlapping private IP address space if the default private IP address space overlaps with the provider private IP address space.

8. The system of claim 6 further comprising means for selecting from the default IP address space a private IP address, and assigning the selected private IP address to a network device if the default private IP address space does not overlap with the provider private IP address space.

9. The system of claim 6 further comprising means for selecting a private IP address from the largest available non-overlapping private IP address space and assigning the selected private IP address to a network device if the default private IP address space overlaps with the provider private IP address space.

10. A machine readable medium having embodied thereon a program being executable by a machine to perform operations for selecting and assigning non-overlapping private IP addresses, the operations method steps comprising:
setting an internal address space to a default private IP address space, wherein IP addresses from a private address space are not directly accessible from the public internet;
receiving a provider private IP address space;
determining if the default private IP address space overlaps with the provider private IP address space; and
if the default private IP address space overlaps with the provider private IP address space, then selecting a largest available non-overlapping private IP address space.

11. The machine readable medium of claim 10 further comprising the operation of iterating through available private IP address space to find the largest available non-overlapping private IP address space if the default private IP address space overlaps with the provider private IP address space.

12. The machine readable medium of claim 10 further comprising the operations of selecting from the default IP address space a private IP address and assigning the selected private IP address to a network device if the default private IP address space does not overlap with the provider private IP address space.

13. The machine readable medium of claim 10 further comprising the operations of selecting a private IP address from the largest available non-overlapping private IP address space and assigning the selected private IP address to a network device if the default private IP address space overlaps with the provider private IP address space.

14. An apparatus capable of automatically selecting and assigning non-overlapping private IP addresses to devices within a local network, comprising:
an IP module, the IP module setting an internal address space to a default address space, wherein IP addresses from a private address space are not directly accessible from the public internet;
a client module coupled to the IP module for determining a private IP address assigned to a gateway device; and
a server module coupled to the IP module for automatically assigning a non-overlapping private IP address to a network device.

15. The apparatus of claim 14 wherein the client module is a Dynamic Host Configuration Protocol client.

16. The apparatus of claim 14 wherein the client module is a Point-to-Point Protocol client.

17. The apparatus of claim 14 wherein the server module is a Dynamic Host Configuration Protocol server.

18. The apparatus of claim 14 wherein the IP module determines if the default private IP address space overlaps with the private IP address assigned to the gateway device.

19. The apparatus of claim 18 wherein the IP module iterates through available private IP address space to find a largest available non-overlapping private IP address space if the default private IP address space overlaps with the private IP address assigned to the gateway device.

20. The apparatus of claim 18 wherein the apparatus is the gateway device.

21. The apparatus of claim 18 wherein the apparatus is sever of an Internet Service Provider.

* * * * *